US012682103B2

(12) United States Patent
Ouyang

(10) Patent No.: US 12,682,103 B2
(45) Date of Patent: Jul. 14, 2026

(54) USER-SPECIFIC ACCESS CONTROL FOR METADATA TABLES

(71) Applicant: SAP SE, Walldorf (DE)

(72) Inventor: Yinghua Ouyang, Xi'an (CN)

(73) Assignee: SAP SE, Walldorf (DE)

( * ) Notice: Subject to any disclaimer, the term of this patent is extended or adjusted under 35 U.S.C. 154(b) by 193 days.

(21) Appl. No.: 18/496,416

(22) Filed: Oct. 27, 2023

(65) Prior Publication Data

US 2025/0139276 A1     May 1, 2025

(51) Int. Cl.
*G06F 21/00* (2013.01)
*G06F 21/62* (2013.01)

(52) U.S. Cl.
CPC ................................. *G06F 21/6227* (2013.01)

(58) Field of Classification Search
None
See application file for complete search history.

(56) References Cited

U.S. PATENT DOCUMENTS

| | | | |
|---|---|---|---|
| 6,185,684 B1 * | 2/2001 | Pravetz ............... | G06F 21/6209 |
| | | | 713/168 |
| 7,174,353 B2 * | 2/2007 | Friske ................. | G06F 16/2455 |
| | | | 707/999.203 |
| 8,131,762 B2 * | 3/2012 | Smetters ............. | G06F 16/2453 |
| | | | 712/216 |
| 8,166,071 B1 * | 4/2012 | Korablev ............. | G06F 21/604 |
| | | | 707/783 |

| | | | |
|---|---|---|---|
| 8,543,566 B2 * | 9/2013 | Weissman ........... | G06F 16/2462 |
| | | | 707/715 |
| 9,177,171 B2 * | 11/2015 | Roitman ............. | G06F 21/6227 |
| 9,235,846 B2 * | 1/2016 | Petschulat ............ | G06F 16/248 |
| 9,330,159 B2 * | 5/2016 | Pederson .............. | G06F 16/278 |
| 10,380,094 B2 * | 8/2019 | Warshavsky .......... | G06F 16/221 |
| 10,545,984 B2 | 1/2020 | Zhang et al. | |
| 10,795,901 B2 * | 10/2020 | Tolani ................... | G06F 16/215 |
| 11,061,897 B2 * | 7/2021 | Zimmermann ..... | G06F 16/2282 |
| 11,288,274 B1 * | 3/2022 | Alsaadi ................. | G06F 16/278 |
| 11,494,359 B2 | 11/2022 | Hao et al. | |

(Continued)

OTHER PUBLICATIONS

U.S. Appl. No. 17/983,589, Ouyang et al., Processing Correlated Calculated Fields in Correlated Subqueries, filed Nov. 9, 2022, 25 pages.

(Continued)

*Primary Examiner* — Maung T Lwin
(74) *Attorney, Agent, or Firm* — Fish & Richardson P.C.

(57) ABSTRACT

The present disclosure involves systems, software, and computer implemented methods for user-specific access control for metadata tables. An example method includes receiving, from a user, a query that queries a metadata table. For each metadata table row, a determination is made as to whether the user owns the object represented by the metadata table row. If the user owns the object, the row is included in a result set for the query. If the user does not own the object, a determination is made as to whether the user has access permission to the object. If the user has access permission to the object, the row is included in the result set. If the user does not have access permission to the object, the row is excluded from the result set. After all metadata tables rows are processed, the result set is provided in response to the query.

14 Claims, 5 Drawing Sheets

(56) References Cited

U.S. PATENT DOCUMENTS

| | | | |
|---|---|---|---|
| 11,775,521 B2 | 10/2023 | Ouyang et al. | |
| 11,803,650 B1* | 10/2023 | Hocanin | G06F 16/221 |
| 2003/0151633 A1* | 8/2003 | George | G06F 16/252 |
| | | | 707/E17.121 |
| 2007/0124276 A1* | 5/2007 | Weissman | G06F 16/24575 |
| 2007/0174281 A1* | 7/2007 | Chase | H04N 21/4627 |
| | | | 348/E7.071 |
| 2010/0063971 A1* | 3/2010 | Cragun | G06F 16/954 |
| | | | 707/783 |
| 2011/0196896 A1* | 8/2011 | Smetters | G06F 16/2453 |
| | | | 707/E17.005 |
| 2013/0173594 A1* | 7/2013 | Xu | G06F 16/245 |
| | | | 707/E17.046 |
| 2016/0292429 A1* | 10/2016 | Manville | G06F 3/0641 |
| 2020/0183916 A1* | 6/2020 | Shultis | G16H 10/60 |
| 2020/0320094 A1 | 10/2020 | Ouyang et al. | |
| 2021/0303576 A1 | 9/2021 | Ouyang et al. | |
| 2023/0063528 A1 | 3/2023 | Ouyang | |
| 2023/0094628 A1* | 3/2023 | Yadav | G06F 11/1451 |
| | | | 726/30 |
| 2023/0237186 A1* | 7/2023 | Albasha | G06F 21/6218 |
| | | | 726/28 |
| 2023/0367773 A1* | 11/2023 | Kondiles | G06F 16/221 |
| 2024/0143823 A1* | 5/2024 | Brenner | G06F 16/125 |
| 2025/0045445 A1* | 2/2025 | Srinivasan | G06F 21/6227 |

OTHER PUBLICATIONS

U.S. Appl. No. 17/985,294, Ouyang, Efficiently Accessing Shared Operators in Database Query Plans, filed Nov. 11, 2022, 19 pages.
U.S. Appl. No. 18/169,271, Ouyang et al., Efficient Memory Leak Detection in Database Systems, filed Feb. 15, 2023, 22 pages.
U.S. Appl. No. 18/180,221, Zhang et al., Authorization Checks and Auditing for Queries in Database Systems, filed Mar. 8, 2023, 27 pages.

* cited by examiner

TABLES Table Definition 203

| COLUMN_NAME | DATA_TYPE | LENGTH |
|---|---|---|
| SCHEMA_NAME | NVARCHAR | 256 |
| TABLE_NAME | NVARCHAR | 256 |
| TABLE_OID | BIGINT | 19 |
| IS_USER_DEFINED_TYPE | NVARCHAR | 5 |
| ...... | ...... | ...... |

204  206  208  210

212 ⤳ create table TABLE1(c1 int, c2 bigint, c3 varchar(20))

TABLES Table 202

| | SCHEMA_NAME | TABLE_NAME | TABLE_OID | IS_USER_DEFINED_TYPE |
|---|---|---|---|---|
| 1 | SYSTEM | TABLE2 | 1222345 | FALSE |
| 2 | SYSTEM | TABLE3 | 3385855 | FALSE |
| 3 | SYSTEM | TABLE1 | 8844544 | FALSE |

User Query

404 — USER1:    select * from TABLES — 402

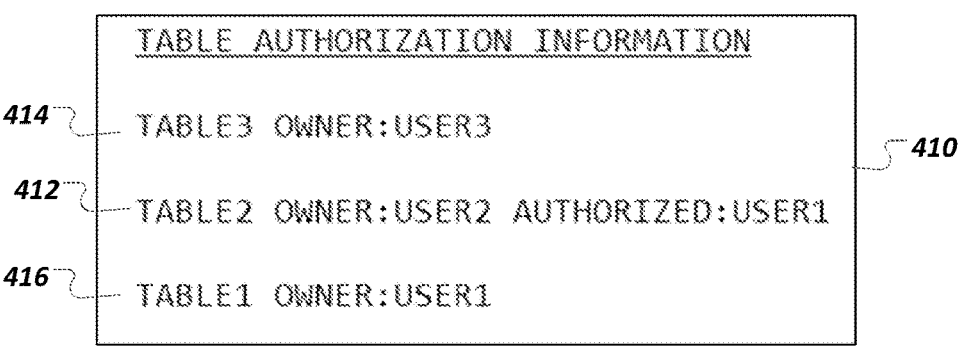

TABLE AUTHORIZATION INFORMATION

414 — TABLE3 OWNER:USER3

412 — TABLE2 OWNER:USER2 AUTHORIZED:USER1                410

416 — TABLE1 OWNER:USER1

Tables Table    406

|   | SCHEMA_NAME | TABLE_NAME | TABLE_OID | IS_USER_DEFINED_TYPE |
|---|-------------|------------|-----------|----------------------|
| 1 — 411 | SYSTEM | TABLE2 | 1222345 | FALSE |
| 2 — 413 | SYSTEM | TABLE3 | 3385855 | FALSE |
| 3 — 415 | SYSTEM | TABLE1 | 8844544 | FALSE |

418    428    424

422    Query Result

| SCHEMA_NAME | TABLE_NAME | TABLE_OID | IS_USER_DEFINED_TYPE |
|-------------|------------|-----------|----------------------|
| 426 SYSTEM | TABLE2 | 1222345 | FALSE |
| 420 SYSTEM | TABLE1 | 8844544 | FALSE |

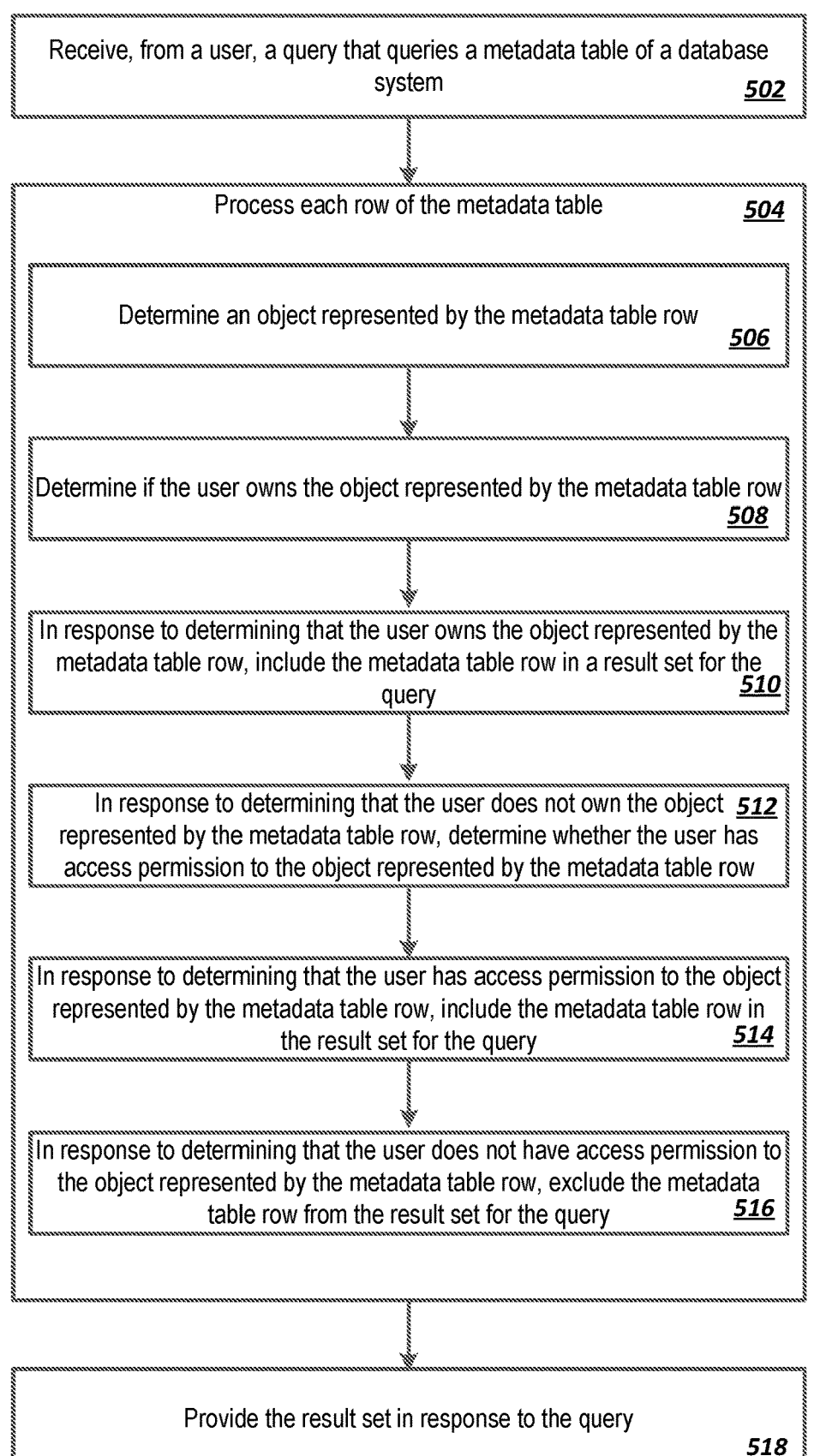
FIG. 5    *500*

USER-SPECIFIC ACCESS CONTROL FOR METADATA TABLES

TECHNICAL FIELD

The present disclosure relates to computer-implemented methods, software, and systems for user-specific access control for metadata tables.

BACKGROUND

A relational database can be used to store data for an organization. A database can include various types of objects, which can be referred to as catalog objects. Example types of catalog objects that can be included in a database include tables, views, functions, procedures, indexes, synonyms, and others.

SUMMARY

The present disclosure involves systems, software, and computer implemented methods for user-specific access control for metadata tables. An example method includes: receiving, from a user, a query that queries a metadata table of a database system; processing each row of the metadata table, wherein processing a metadata table row comprises: determining an object represented by the metadata table row; determining if the user owns the object represented by the metadata table row; in response to determining that the user owns the object represented by the metadata table row, including the metadata table row in a result set for the query; in response to determining that the user does not own the object represented by the metadata table row, determining whether the user has access permission to the object represented by the metadata table row; in response to determining that the user has access permission to the object represented by the metadata table row, including the metadata table row in the result set for the query; and in response to determining that the user does not have access permission to the object represented by the metadata table row, excluding the metadata table row from the result set for the query; and providing the result set in response to the query.

Implementations may include one or more of the following features. The metadata table can store metadata about a particular type of database catalog object. The metadata table can store metadata about tables, views, stored procedures, functions, or indices. The metadata table can be a system table. The query can be received from a process for which the user is an effective user. The result set can be provided to the process. A first row of the metadata table can be included in the result set based on the user owning the object represented by the first row of the metadata table. The first row of the metadata table can be included in the result set based on the first row of the metadata table also matching a query condition included in the query. A second row of the metadata table can be included in the result set based on the user having access permission to the object represented by the second row of the metadata table. A third row of the metadata table can be excluded from the result set based on the user not owning the object represented by the third row of the metadata table and the user not having access permission to the object represented by the third row of the metadata table. A user who owns the object can be the user who creates the object.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 2 illustrates example metadata table information.

FIG. 4 illustrates example query processing information.

FIG. 5 is a flowchart of an example method for user-specific access control for metadata tables.

DETAILED DESCRIPTION

Database systems can include metadata tables to store metadata of database objects such as tables, views, and other types of objects created by database users. The metadata tables can include metadata for the created objects, such as object identifiers, schema names, object names, and other properties. Due to security reasons, users should be able to access only appropriate rows of the metadata table. For example, users should only be able to access rows in the metadata table that correspond to objects that have either been created by the user or objects for which the user has been granted access permission. A user who creates an object can be considered to be an owner of the object.

While such restricted access to metadata table data can be achieved using different user views for different types of metadata tables, such creation and management of multiple such views can add complexity including substantial database resources and maintenance costs. To avoid resource costs for having multiple metadata table views for implementing metadata table security, an improved approach can be used that includes automatic real-time authorization checks on metadata table rows, instead of relying on creation and existence of view objects for achieving security. Accordingly, resource reduction can be achieved because the database no longer has to store view information for metadata tables, and maintenance costs can be reduced since such views no longer need to be created, managed, and maintained. Additionally, the improved approach with automatic real-time authorization checks generally results in faster query performance for metadata table queries, since the improved approach does not involve unfolding view objects or evaluating complex predicates that might be included in view-based approaches to implementing security.

Figure 1:
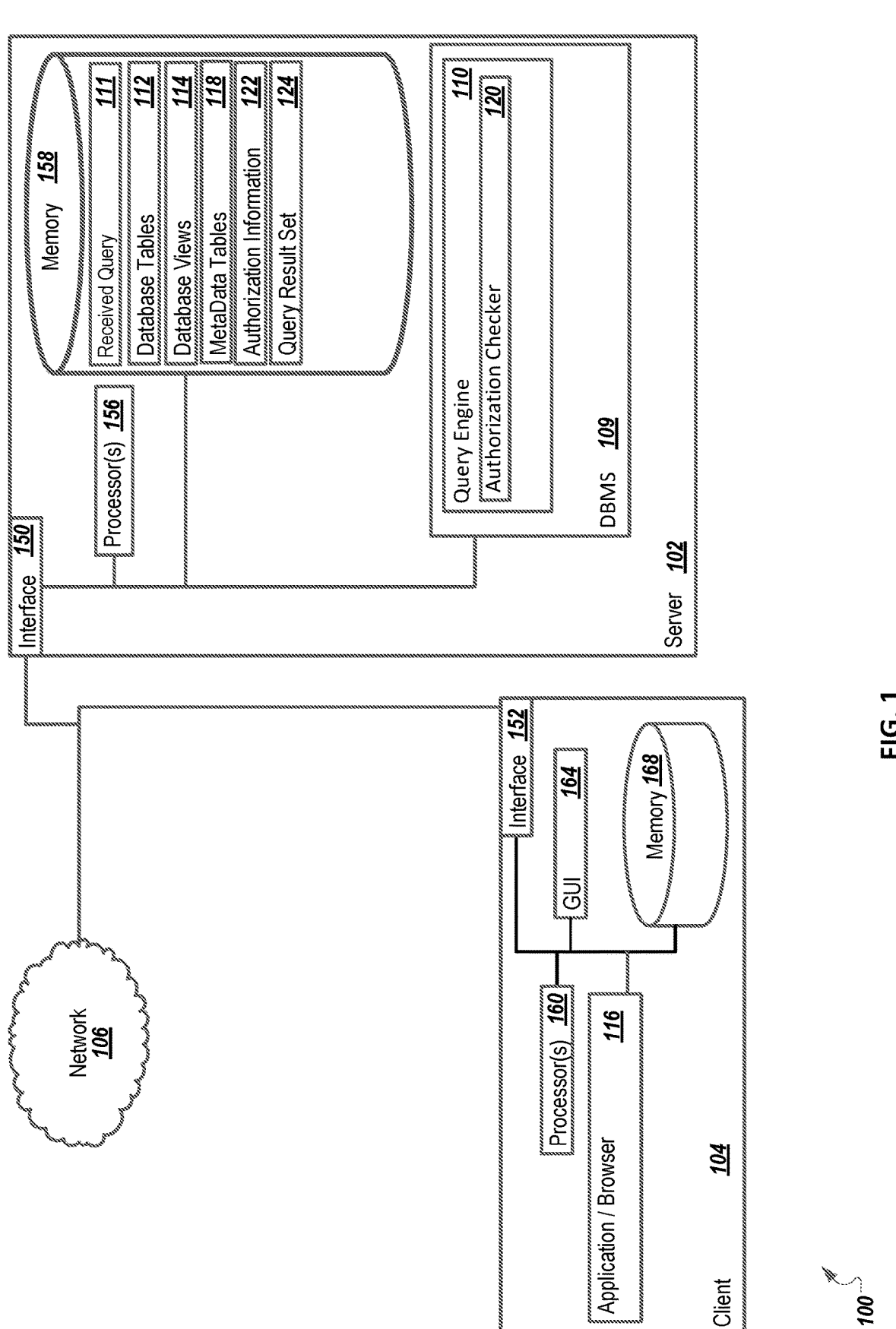
FIG. 1 is a block diagram illustrating an example system for user-specific access control for metadata tables.

FIG. 1 is a block diagram illustrating an example system 100 for user-specific access control for metadata tables. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system, server, or component may be provided by multiple systems, servers, or components, respectively.

A server 102 (e.g., a database server) includes a DBMS (Database Management System) 109 that includes a query engine 110. The query engine 110 can process a received query 111 against database artifacts such as database tables 112, database views 114, etc. The query engine 110 can process queries based on requests received from an application/browser 116, from internal server processes, or other types of requests. Each received query 111 can be sent by a user or by a process which has an effective user.

The received query 111 can be a query against a metadata table included in metadata tables 118. Metadata tables 118 can include a table that stores metadata about the database tables 112, a table that stores metadata about the database views 114, and other metadata tables for other types of database objects. As described above, received queries can be queries that directly query the metadata tables 118, rather than relying on views.

To implement security for metadata table row access for queries that query the metadata tables 118, the query engine 110 can process each row of a metadata table in response to a user query that queries the metadata table. The query engine 110 can, for a given metadata table row, determine an object represented by the metadata table row. For example, when the metadata table includes metadata about the database tables 112, the query engine can determine a table object represented by a current metadata table row being processed.

An authorization checker 120 of the query engine 110 (or of another portion of the DBMS 109 to which the query engine 110 has access) can perform a first authorization check for the metadata table row, to determine, based on authorization information 122, whether a user who submitted the query owns (e.g., has created) the object represented by the metadata table row. If the user owns the object represented by the metadata table row, the query engine 110 can include the metadata table row in a query result set 124 for the query (e.g., if the metadata table row also matches any query conditions that might be included in the query). Regarding query conditions, in some cases, the query engine 110 might first determine which metadata table rows match any query conditions included in the query and then perform the authorization checks described herein. In other cases, the query engine 110 may perform both authorization checks and query condition checks on a given metadata table row, potentially concurrently performing the checks, before proceeding to process a next metadata table row.

For the current metadata table row, if the user does not own the object represented by the metadata table row, the authorization checker 120 can perform a second authorization check to determine whether the user has access permission to the object represented by the metadata table row. If the user has access permission to the object represented by the metadata table row, the query engine 110 can include the metadata table row in the query result set 124. If the user does not have access permission to the object represented by the metadata table row, the query engine 110 can exclude the metadata table row from the query result set 124. In other words, the query engine 110 can exclude from the query result set 124 a particular metadata table row for which both authorization checks performed by the authorization checker 120 return false.

After the query engine 110 has processed each row of the metadata table being queried, the query engine 110 can return the query result set 124 to the user or the process acting on behalf of the user. For example, the query result set 124 can be provided to the application/browser 116. As mentioned above, generating the query result set 124 using direct querying of metadata tables 118 rather than relying on database views 114 can result in faster query performance and a fewer number of views needing to be created and maintained.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150 and 152 are used by the client device 104 and the server 102, respectively, for communicating with other systems in a distributed environment—including within the system 100—connected to the network 106. Generally, the interfaces 150 and 152 each comprise logic encoded in software and/or hardware in a suitable combination and operable to communicate with the network 106. More specifically, the interfaces 150 and 152 may each comprise software supporting one or more communication protocols associated with communications such that the network 106 or interface's hardware is operable to communicate physical signals within and outside of the illustrated system 100.

The server 102 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the server 102. Specifically, each processor 154 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 156. In some implementations, the server 102 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the application/browser 116. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 158. Each processor 158 included in the client device 104 may be a central processing unit (CPU), an application specific integrated circuit (ASIC), a field-programmable gate array (FPGA), or another suitable component. Generally, each processor 158 included in the client device 104 executes instructions and manipulates data to perform the operations of the client device 104. Specifically, each processor 158 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 160.

The GUI 160 of the client device 104 interfaces with at least a portion of the system 100 for any suitable purpose, including generating a visual representation of the application/browser 116. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a generic web browser, intelligent engine, and command line interface (CLI) that processes information and efficiently presents the results to the user visually.

Memory 162 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

FIG. 2 illustrates example metadata table information 200. For example, a metadata table 202 named "TABLES" can store metadata about table objects in a database. The metadata table 202 has a corresponding table definition 203 that defines columns included in the metadata table 202. For example, the table definition 203 specifies that the metadata table 202 has schema_name 204, table_name 206, table_oid (e.g., object identifier) 208, is_user_defined_type 210, and other columns. The database system can also include metadata tables for other object types, such as database views and other object types. The illustrated metadata table 202 in FIG. 2 shows an example subset of columns (e.g., the columns 204, 206, 208, and 210) defined for the metadata table 202.

An example create-table statement 212 can be executed by the database system to create a table object in the system with a name of TABLE1. The create-table statement 212 can be executed on behalf of a certain database user, who can be associated with the TABLE1 table as a table owner. Table ownership and other table authorization information can be stored in other system tables of the database system, for example.

In response to creation of the TABLE1 table object, a record 214 can be added by the database system to the metadata table 202. The metadata table 202 also includes records 216 and 218 for previously-created TABLE2, and TABLE3 tables, respectively. As described below, the database system can support improved querying of the metadata table 202 that does not rely on configuration of different user-specific views.

Figure 3:
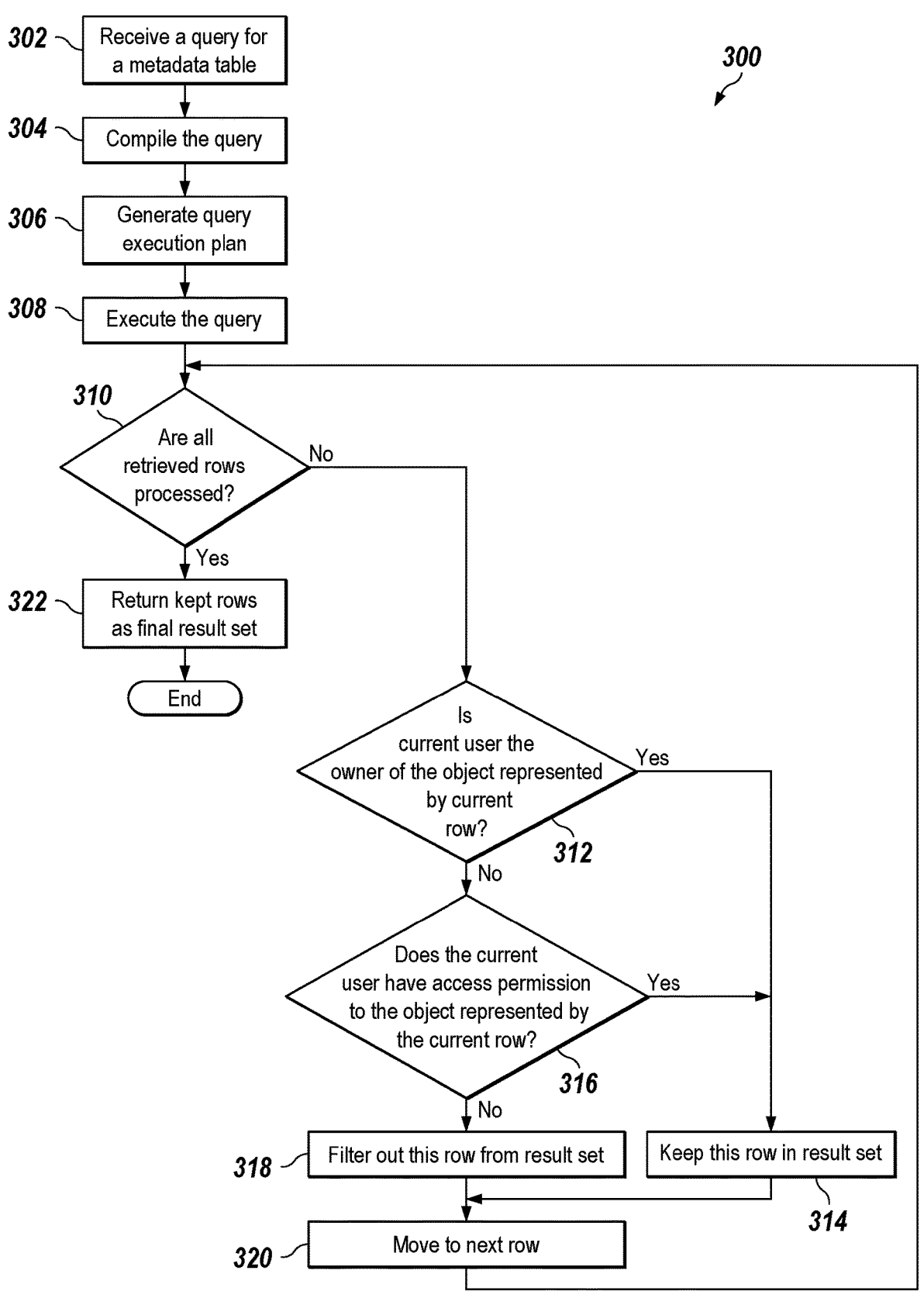
FIG. 3 is a flowchart of example process.

FIG. 3 is a flowchart of example process 300. The process 300 is described in combination with example query processing information 400 displayed in FIG. 4.

At 302, as shown in FIG. 3, a query for a metadata table is received. For example and as shown in FIG. 4, a query 402 of "select * from TABLES" can be received, from a USER1 user 404 (or from a process where the USER1 user 404 is the effective user), where "TABLES" is a name of a metadata table (e.g., an example metadata table 406). The example metadata table 406 corresponds to the example metadata table 202 of FIG. 2 and includes metadata information about table objects.

At 304 in FIG. 3, the query is compiled. Compiling the query can include checking query syntax and query semantics.

At 306, a query execution plan is generated. The query execution plan can include a sequence of steps to implement execution of the query.

At 308, the query is executed according to the query execution plan. Executing the query can include retrieving and processing each row of the metadata table to determine which rows of the metadata table to include in a query result.

For instance, in the example of FIG. 4, each row of the example metadata table 406 can be processed. Processing each row of the example metadata table 406 can involve evaluation of example table authorization information 410. In general, table authorization information can be stored or represented in a database in various ways, in one or more tables. The example table authorization information 410 is shown in a simplified form that includes listings of table owners and indications of whether any non-table owners have been authorized to access respective tables.

At 310 in FIG. 3, a determination is made as to whether all retrieved rows of the metadata table have been processed.

At 312, if not all retrieved rows of the metadata table have been processed, a determination is made as to whether the current user is the owner of the object represented by a current row of the metadata table.

For instance, in the example of FIG. 4, an object represented by a row 411 of the example metadata table 406 is the TABLE2 table. A determination can be made, based on evaluating table authorization information 412 for TABLE2 in the example table authorization information 410, that the current user associated with the query (e.g., USER1) is not the owner of the TABLE2 object (e.g., USER2 is the owner of TABLE2).

Similarly, for an example of a row 413 in the example metadata table 406, the object represented by the row 413 is the TABLE3 table. A determination can be made, based on evaluating table authorization information 414 for TABLE3 in the example table authorization information 410, that the current user associated with the query (e.g., USER1) is not the owner of the TABLE3 object (e.g., USER3 is the owner of TABLE3).

However, for an example of a row 415 in the example metadata table 406, the object represented by the row 415 is the TABLE1 table. A determination can be made, based on evaluating table authorization information 416 for TABLE1 in the example table authorization information 410, that the current user associated with the query (e.g., USER1) is the owner of the TABLE1 object.

At 314 in FIG. 3, if the current user is the owner of the object represented by the current retrieved row of the metadata table, the current row is included in (e.g., kept in) a query result set. For example, for the above FIG. 4 examples of rows 411, 413, and 415 of the example metadata table 406, only the row 415 met a condition of the current user being the owner of the object represented by the current row of the metadata table, so only the row 415 is included in the query result as a result of executing step 314 (e.g., as illustrated by an arrow 418 and by a record 420 included in an example query result set 422).

At 316 in FIG. 3, if the current user is not the owner of the object represented by the current row of the metadata table, a determination is made as to whether the current user has access permission to the object represented by the current row. If the current user has access permission to the object represented by the current row, the current row is included in (e.g., kept in) the result set (e.g., as illustrated at step 314).

For instance, for the FIG. 4 example of row 411 in the example metadata table 406, a determination can be made, based on evaluating the table authorization information 412 for TABLE2 in the example table authorization information 410, that the current user associated with the query (e.g., USER1) does have access permission to the TABLE2 object. Accordingly, as illustrated by an arrow 424, a row 426 corresponding to the row 411 is included in the query result set 422.

At 318 in FIG. 3, if the current user does not have access permission to the object represented by the current row, the row is filtered out of (e.g., not kept in) the result set.

For instance, for the FIG. 4 example of row 413 in the example metadata table 406, a determination can be made, based on evaluating the table authorization information 414 for TABLE3 in the example table authorization information 410, that the current user associated with the query (e.g., USER1) does not have access permission to the TABLE3 object. Accordingly, as illustrated by a symbol 428, the row 413 is not included in the query result set 422.

At 320, the process 300 proceeds to the next row of the metadata table, if a next row is available (e.g., a next current row is identified, or an end of retrieved records is reached), and processing continues again at step 310. At 310, when a determination is made that all retrieved rows have been processed, the process 300 proceeds to step 322.

At 322, the rows that have been kept in (e.g., included in) the result set are returned as a final result set for the query. For instance, in the example of FIG. 4, the query result set 422 can be returned to USER1 (or the process associated with USER1) in response to the query 402.

FIG. 5 is a flowchart of an example method for user-specific access control for metadata tables. It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by one or more components of the system 100 described above with respect to FIG. 1. For example, the method 500 and related methods can be executed by the query engine 110 of FIG. 1.

At 502, a query is received, from a user, that is used to query a metadata table of a database system. The metadata table can be a system table that stores metadata about a particular type of database catalog object, such as tables, views, stored procedures, functions, or indices. The query can be received from the user in a user interface or the query can be received from a process for which the user is an effective user.

At 504, each row of the metadata table is processed. Processing a metadata table row can include multiple steps.

At 506, an object represented by the metadata table row is determined.

At 508, a determination is made as to whether the user owns the object represented by the metadata table row. The user can be considered as an owner of the object if the user has created the object.

At 510, in response to determining that the user owns the object represented by the metadata table row, the metadata table row is included in a result set for the query.

At 512, in response to determining that the user does not own the object represented by the metadata table row, a determination is made as to whether the user has access permission to the object represented by the metadata table row.

At 514, in response to determining that the user has access permission to the object represented by the metadata table row, the metadata table row is included in the result set for the query.

At 516, in response to determining that the user does not have access permission to the object represented by the metadata table row, the metadata table row is excluded from the result set for the query.

At 518, the result set is provided in response to the query. For example, the result set can be provided to the user for display in a user interface. As another example, when the query is received from a process for which the user is an effective user, the result set can be provided to the process. As examples, a first row of the metadata table can be included in the result set based on the user owning the object represented by the first row of the metadata table, a second row of the metadata table can be included in the result set based on the user having access permission to the object represented by the second row of the metadata table, and/or a third row of the metadata table can be excluded from the result set based on the user not owning the object represented by the third row of the metadata table and the user not having access permission to the object represented by the third row of the metadata table.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving, from a user, a query that queries a system metadata table of a database system that includes database system metadata about database catalog objects created by users of the database system, wherein the system metadata table is created with a corresponding table definition defining columns included in the system metadata table and wherein the corresponding table definition includes column names of columns, data types of the column names, and length values indicating sizes of the data types;

processing rows of the system metadata table in response to the query, wherein processing a respective row of the rows of the system metadata table comprises:
determining a database catalog object represented by the respective row of the system metadata table;
determining if the user owns the database catalog object represented by the respective row of the system metadata table using table authorization information;
in response to determining that the user owns the database catalog object represented by the respective row of the system metadata table, including the respective row of the system metadata table in a result set for the query;
in response to determining that the user does not own the database catalog object represented by the respective row of the system metadata table, determining whether the user has access permission to the database catalog object represented by the respective row of the system metadata table;
in response to determining that the user has access permission to the database catalog object represented by the respective row of the system metadata table, including the respective row of the system metadata table in the result set for the query; and
in response to determining that the user does not have access permission to the database catalog object represented by the respective row of the system metadata table, excluding the respective row of the system metadata table from the result set for the query; and
providing, to the user, the result set in response to the query.

2. The computer-implemented method of claim 1, wherein the system metadata table stores metadata about database catalog object types of tables, views, stored procedures, functions, or indices.

3. The computer-implemented method of claim 1, wherein the query is received from a process associated with the user.

4. The computer-implemented method of claim 3, wherein the result set is provided to the process.

5. The computer-implemented method of claim 1, wherein a first row of the system metadata table is included in the result set based on the user owning a database catalog object represented by the first row of the system metadata table.

6. The computer-implemented method of claim 5, wherein the first row of the system metadata table is included in the result set based on the first row of the system metadata table also matching a query condition included in the query.

7. The computer-implemented method of claim 1, wherein a second row of the system metadata table is included in the result set based on the user having access permission to a database catalog object represented by the second row of the system metadata table.

8. The computer-implemented method of claim 1, wherein a third row of the system metadata table is not included in the result set based on the user not owning a database catalog object represented by the third row of the system metadata table and the user not having access permission to the database catalog object represented by the third row of the system metadata table.

9. The computer-implemented method of claim 1, wherein a user who owns a database catalog object is the user who creates the database catalog object.

10. A system comprising:

one or more computers; and a computer-readable medium coupled to the one or more computers having instructions stored thereon which, when executed by the one or more computers, cause the one or more computers to perform operations comprising:

receiving, from a user, a query that queries a system metadata table of a database system that includes database system metadata about database catalog objects created by users of the database system, wherein the system metadata table is created with a corresponding table definition defining columns included in the system metadata table and wherein the corresponding table definition includes column names of columns, data types of the column names, and length values indicating sizes of the data types;

processing rows of the system metadata table in response to the query, wherein processing a respective row of the rows of the system metadata table comprises:

determining a database catalog object represented by the respective row of the system metadata table;

determining if the user owns the database catalog object represented by the respective row of the system metadata table using table authorization information;

in response to determining that the user owns the database catalog object represented by the respective row of the system metadata table, including the respective row of the system metadata table in a result set for the query;

in response to determining that the user does not own the database catalog object represented by the respective row of the system metadata table, determining whether the user has access permission to the database catalog object represented by the respective row of the system metadata table;

in response to determining that the user has access permission to the database catalog object represented by the respective row of the system metadata table, including the respective row of the system metadata table in the result set for the query; and in response to determining that the user does not have access permission to the database catalog object represented by the respective row of the system metadata table, excluding the respective row of the system metadata table from the result set for the query; and providing, to the user, the result set in response to the query.

11. The system of claim 10, wherein the system metadata table stores metadata about database catalog object types of tables, views, stored procedures, functions, or indices.

12. The system of claim 10, wherein the query is received from a process associated with the user.

13. A non-transitory computer-readable storage medium storing instructions which when executed by one or more processors is configured to perform operations comprising:

receiving, from a user, a query that queries a system metadata table of a database system that includes database system metadata about database catalog objects created by users of the database system, wherein the system metadata table is created with a corresponding table definition defining columns included in the system metadata table and wherein the corresponding table definition includes column names of columns, data types of the column names, and length values indicating sizes of the data types;

processing rows of the system metadata table in response to the query, wherein processing a respective row of the rows of the system metadata table comprises:

determining a database catalog object represented by the respective row of the system metadata table;

determining if the user owns the database catalog object represented by the respective row of the system metadata table using table authorization information;

in response to determining that the user owns the database catalog object represented by the respective row of the system metadata table, including the respective row of the system metadata table in a result set for the query;

in response to determining that the user does not own the database catalog object represented by the respective row of the system metadata table, determining whether the user has access permission to the database catalog object represented by the respective row of the system metadata table;

in response to determining that the user has access permission to the database catalog object represented by the respective row of the system metadata table, including the respective row of the system metadata table in the result set for the query; and in response to determining that the user does not have access permission to the database catalog object represented by the respective row of the system metadata table, excluding the respective row of the system metadata table from the result set for the query; and providing, to the user, the result set in response to the query.

14. The computer-readable storage medium of claim 13, wherein the system metadata table stores metadata about database catalog object types of tables, views, stored procedures, functions, or indices.

* * * * *